US012521584B2

(12) United States Patent
Laskaris et al.

(10) Patent No.: US 12,521,584 B2
(45) Date of Patent: Jan. 13, 2026

(54) WIRED SMART NOZZLE

(71) Applicant: AKRON BRASS COMPANY, Wooster, OH (US)

(72) Inventors: Mike Laskaris, Collegeville, PA (US); Jon A. Jenkins, Wooster, OH (US); Brian Keim, Wooster, OH (US); Sean O'Brien, Apple Creek, OH (US)

(73) Assignee: AKRON BRASS COMPANY, Wooster, OH (US)

(*) Notice: Subject to any disclaimer, the term of this patent is extended or adjusted under 35 U.S.C. 154(b) by 865 days.

(21) Appl. No.: 17/314,652

(22) Filed: May 7, 2021

(65) Prior Publication Data

US 2021/0346741 A1 Nov. 11, 2021

Related U.S. Application Data

(60) Provisional application No. 63/021,126, filed on May 7, 2020.

(51) Int. Cl.

| | |
|---|---|
| ***A62C 31/28*** | (2006.01) |
| ***A62C 33/06*** | (2006.01) |
| ***A62C 37/08*** | (2006.01) |
| *A62C 31/00* | (2006.01) |

(52) U.S. Cl.

CPC .............. *A62C 33/06* (2013.01); *A62C 31/28* (2013.01); *A62C 37/08* (2013.01); *A62C 31/005* (2013.01)

(58) Field of Classification Search

CPC .......... H01R 39/08; A62C 33/06; A62C 31/28
USPC ............................................... 439/16; 169/61
See application file for complete search history.

(56) References Cited

U.S. PATENT DOCUMENTS

| | | | | |
|---|---|---|---|---|
| 3,010,519 A | | 11/1961 | Gilluspie | |
| 3,829,816 A | * | 8/1974 | Barry | H01R 13/5219 285/414 |
| 8,006,923 B2 | * | 8/2011 | Stoops | A62C 31/03 169/88 |
| 9,295,863 B2 | | 3/2016 | McMilliam et al. | |

(Continued)

FOREIGN PATENT DOCUMENTS

| | | |
|---|---|---|
| IT | 201800006087 A1 | 12/2019 |
| KR | 101108969 B1 | 1/2012 |

(Continued)

OTHER PUBLICATIONS

The International Search Report and The Written Opinion of the International Searching Authority from corresponding Patent Application No. PCT/US2021/031311, mailed Aug. 25, 2021, 14 pages.

*Primary Examiner* — Jason J Boeckmann
(74) *Attorney, Agent, or Firm* — Tucker Ellis LLP; Michael G. Craig

(57) ABSTRACT

One or more systems and/or methods are disclosed for a nozzle with wire connection to a hose, which may allow wired communication between the nozzle and a distant control center. A hose connector with one or more locating pins may be used for easy alignment and quick establishment of electrical connection between the nozzle and the hose. The nozzle may comprise a swiveling joint configured to fully swivel while maintaining electrical connection between the hose connector and an electronic housing. A slip ring assembly may be used in the swiveling joint to maintain the electrical connection.

20 Claims, 8 Drawing Sheets

(56) References Cited

U.S. PATENT DOCUMENTS

| | | | | |
|---|---|---|---|---|
| 2006/0051980 A1* | 3/2006 | Kuribayashi | H01J 35/10 | 439/13 |
| 2011/0187524 A1* | 8/2011 | Cochran, III | H04W 76/50 | 340/539.1 |

FOREIGN PATENT DOCUMENTS

| | | | |
|---|---|---|---|
| KR | 101636738 | B1 | 7/2016 |
| WO | 2009129875 | A1 | 10/2009 |

* cited by examiner

WIRED SMART NOZZLE

CROSS REFERENCE TO RELATED APPLICATIONS

This application claims priority to U.S. Ser. No. 63/021,126, entitled WIRED SMART NOZZLE, filed May 7, 2020, which is incorporated herein by reference.

BACKGROUND

When a firefighter uses a nozzle, in some cases, it is the firefighter holding the nozzle that controls the pressure, velocity, direction, shape, etc., of the flow coming out from the nozzle. In other cases, the flow from the nozzle can be controlled by a control center mounted to a fire apparatus distant from the fire scene, such as a fire truck. Wireless and wired communications are available between the control center and the nozzle, and automated wired solution may be more reliable.

To realize wire connection between the control center and the nozzle, a few problems need to be solved. First, usually one or more hoses are connected between the fire truck and the nozzle. Therefore, wire connection between a hose and the nozzle or between two hoses needs to be established in a quick, reliable, and simple way. Second, due to the strong force of high-pressure fluid flow coming out from the nozzle, and ongoing movement of the nozzle, a fully swiveling coupling is used in the nozzle to handle movement and pressure of the nozzle during use.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, systems and methods are disclosed for a wired communication and electrical coupling system between a nozzle and a command center, with a wire connection in the intervening hose(s), which may allow wired communication between the nozzle and a distant control center. In this way, the control center coordinating a fire scene may send signals to the nozzle to adjust the pressure, velocity, direction, shape, etc., of the fluid flow coming out from the nozzle, and may receive signals from the nozzle to adjust flow, pressure, etc., and provide real-time data of the fire scene.

In one implementation of a nozzle, the nozzle may comprise a swiveling joint coupled on one end to a hose coupler, and on the other end to an electronic housing processing signals from the control center. The swiveling joint may be configured in a way that it can fully swivel in a three-hundred and sixty degree manner, for example, to any angle in either direction, while maintaining electrical connection between the hose connector and the electronic housing. For example, the swiveling joint may comprise a slip ring assembly having two or more parts that remain in electrical contact when the swiveling joint swivels.

In other implementations, the hose couplings may comprise a hose connector configured to be easily and quickly connected to another hose. For example, one side of the hose coupling may comprise one or more locating pins for easy alignment with a corresponding structure in the other side of the hose coupling, on the hose. In this way, when two hoses are connected, electrical connection may be appropriately established through a port on the hose connector connecting to a wire, or through a plurality of input ports for power connection, ground connection, and CAN signal transmission, respectively. In this way, wire connection between the hose and the nozzle may be established in a quick, reliable, and simple way.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
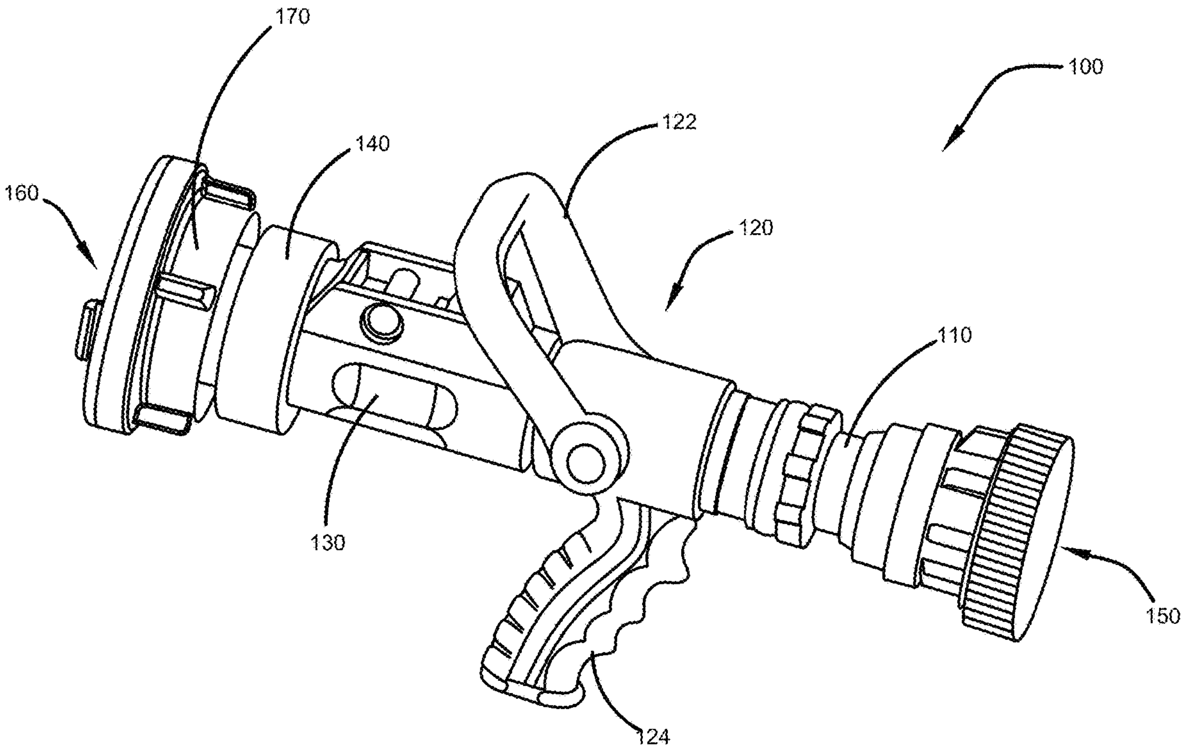
FIG. 1 is a component diagram illustrating a perspective view of an example implementation of a nozzle, having a swivel coupling with electrical coupling.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

FIG. 1 illustrates a perspective view of an exemplary nozzle 100 that comprises a rotating joint in a nozzle-hose coupler assembly, where an electrical coupling may be implemented. As an example, the nozzle 100 may be a smart nozzle apparatus that is configured to send signals to and/or receive signals from a control center (e.g., central controller or central processor) mounted on a fire apparatus, such as a fire truck or scene management system, through a wired communication. For example, the control center may be mounted on a fire truck or fire management system, and may communicate with one or more nozzles.

The nozzle 100 may comprise a nozzle tip 110 that can be adjusted to form a desired fluid shape that is produced from the flow outlet 150. In one example, the nozzle tip 110 may be a 1720 Turbojet. The nozzle tip 110 can also be used to adjust the flow from a dispersed pattern to a straight pattern (e.g., by rotating a pattern sleeve). The nozzle 100 may also comprise an inlet valve assembly 120, which may further comprise a shutoff component 122 and a grip component 124. The shutoff component 122 may be used to control an internal ball valve to open and close fluid flow into the nozzle tip 110, or to adjust the amount of fluid flow into the nozzle tip 110. The grip component 124 may be configured to be hand-held by a user.

The nozzle 100 may comprise a communicator 130, making up a communications control portion of the nozzle 100, that comprises a housing to house electrical and communications devices. The communicator 130 can be used to, among other things, process signals from the control center, control the pressure, velocity, direction, shape, etc., of the fluid flow, and/or generate and send signals indicative of state data of the nozzle, sensor data indicative of fluid flow characteristics (e.g., pressure, flow rate, temperature, etc.) and command data (e.g., user commands) to the control center. The communications control portion 130 may comprise user inputs (e.g., buttons) that can be used to generate certain alerts, commands, or other signals, which can be transmitted to the control center, such as fluid pressure or flow rate demands (e.g., increase/decrease). Additionally, the nozzle 100 may comprise a rotating/swiveling joint 140 and a hose connector 170 to be connected to a hose. The rotating joint 140 may be part of a nozzle-hose coupler or connector 170 at one end, and coupled to the communications control portion 130 at the other end. The rotating joint 140 may be configured in a way allows independent rotation of the hose and nozzle around a central axis, while wire connection between the hose connector 170 and the electronic housing 130 is maintained when the rotating joint 140 rotates/swivels (e.g., in a 360 degree manner).

Figure 2:
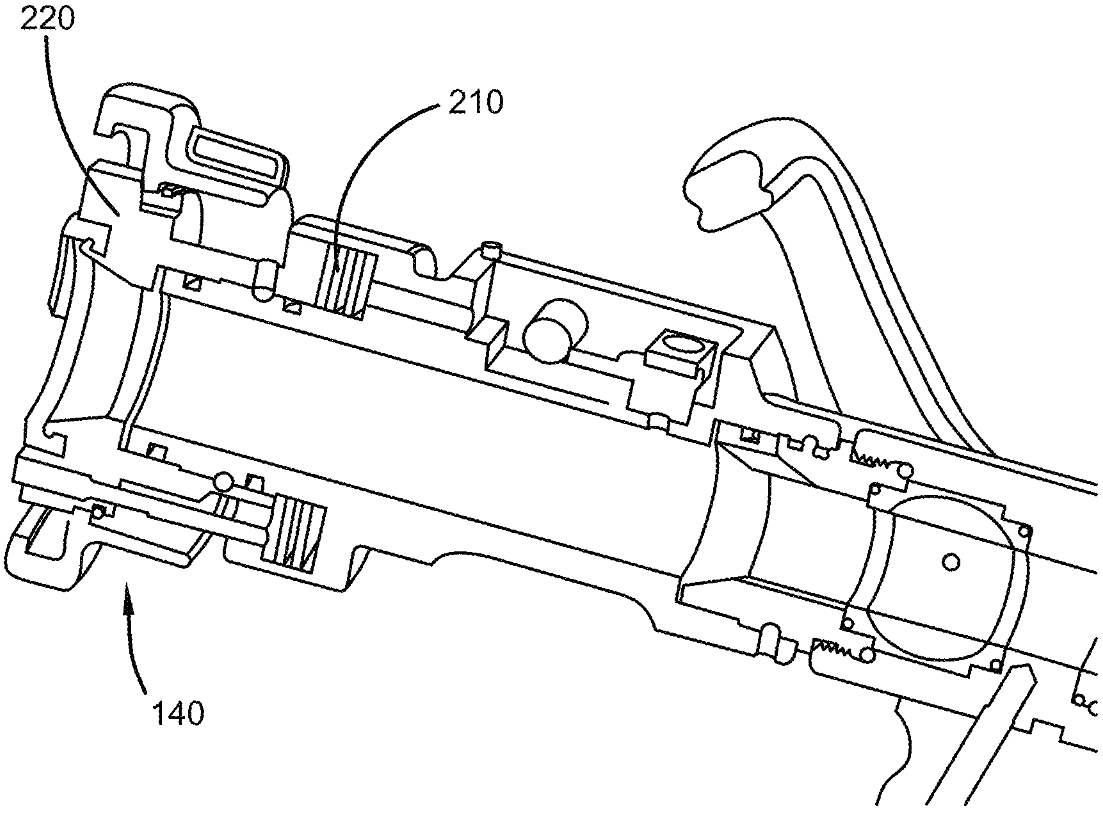
FIG. 2 is a component diagram illustrating a cut-away view of an example implementation where one or more portions of one or more techniques described herein may be implemented.

FIG. 2 is a component diagram illustrating a cut-away view of the example coupling 200, where the communication control portion 130 and nozzle-hose coupler 250 are communicatively coupled in a rotating arrangement. The nozzle-hose coupler 250 comprises a rotating joint 140, which can comprise a slip ring style electrical coupling 210 that is disposed between, and maintains electrical coupling between, the communication control portion 130 (communicator) and nozzle-hose coupler 250 (e.g., and coupled hose). The slip ring style electrical coupling 210 can be configured to maintain electrical coupling while operably rotating about a central axis 260 of the joint (e.g., 360 degrees). Further, the rotating joint 140 may comprise a wire coupler 220 disposed at an inlet portion 210 of the nozzle-hose coupler 250. In operation, the wire coupler 220 can be coupled to a complementary coupler on a hose so that a wired connection between the hose and the nozzle is established, while the attached hose and nozzle can rotate about the axis 260 independently of each other.

Further, as illustrated, the example coupling 200 can comprise one or more gaskets 230, 240, such as O-rings, respectively disposed in a gasket channel 232, 242. In this example, the gaskets 230, 232 can be disposed between the inlet coupling 210 and the joint housing 260. In this example, the joint housing 260 can be used to house the slip ring coupling 210 in combination with the inlet coupling 210. The respective gaskets 230, 240 can be used to provide a water resistant seal between the outside and inside of the joint housing, for example, to mitigate problems cause by water intrusion on the electrical components of the slip ring coupling 210.

Figure 3:
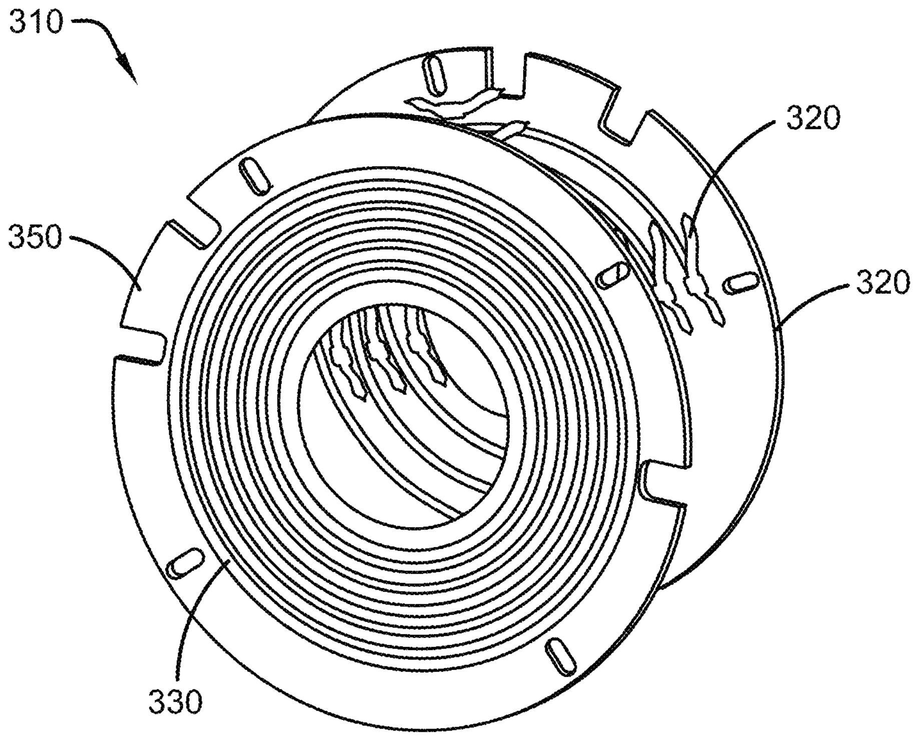
FIG. 3 is a component diagram illustrating an example implementation of an example slip ring where one or more portions of one or more techniques described herein may be implemented.

FIG. 3 illustrates an example implementation of a slip ring coupling 310 coupling, where an electrical and/or communication coupling is implemented in a swivel arrangement. A slip ring 320, 350 can be an electromechanical device that allows the transmission of power, communication and other electrical signals from a stationary portion to a rotating portion (e.g., hose to nozzle). Sometimes known as a rotary electrical joint, collector or electric swivel, a slip ring can be used in an electromechanical system that allows for continuous rotation while transmitting power and/or data.

In this implementation of the slip ring coupling 310, and first slip ring 340 may comprise a plurality of contact feet 320 and a second slip ring 350 may comprise a plurality of complementary contact rings 330. For example, each contact foot 320 may be of spaced apart from an adjacent one, and the contact rings 330 may be concentric circles that are spaced to operably contact a complementary contact foot 320. In one example, each contact foot 320 may operably be in electrical contact with a corresponding contact ring 330. For example, when the swiveling joint 140 operably swivels, the contact feet 320 and the contact rings 330 can remain in electrical/communicative coupling as they rotate around the same axis 260 in the same or different directions, independently of each other. In this way, for example, each contact foot 320 may operably remain in electric contact with the corresponding contact ring 330 during the rotation. Therefore, a wired connection can be maintained during the rotation of the swiveling joint 140.

As an example, the first slip ring 340 can comprise the contact feet 320, and the second slip ring 350 can comprise the contact rings 330. In this example, the first slip ring 340 can be electrically/communicatively coupled with communicator 130, in a stationary coupling. Further, in this example, the second slip ring 350 can be electrically/communicatively coupled with wire coupler 220 in the rotating joint 140, in a stationary coupling. In this way, in this example, the mechanical rotatable coupling between the communicator 130 and the rotating joint 140 is maintained, while the electrical/communication coupling between the communicator 130 and a coupled hose can be operably maintained.

FIGS. 4A-4D illustrate another example implementation of a rotary electrical coupling 410 where electrical/communication coupling can be operably maintained between within a rotating joint. It should be noted, that while the implementations described herein show particular components disposed on portions of the nozzle, it is also contemplated that the portions may be placed in the opposite positions on the various components. In this implementation, the rotary electrical coupling 410 may comprise a plurality of contact pins 420. As illustrated, the contact pins 420 can be disposed on the rotating joint 140 portion of the coupling 200. However, in other implementations, the contact pins may be disposed on the communication control portion (communicator) 130 of the coupling 200.

Further, in some implementations, a rotary electrical coupling 410 may comprise a support ring 430 (e.g., a polymer ring) on the exterior of the rotary electrical coupling 410. As an example, the support ring 430 may have a complementary number of contact slits 440 as the number of contact pins 420. For example, each contact pin 420 may fit into a corresponding contact slit 440 so that they remain in electrical contact with the wire coupler 220. The support ring 430 can provide for electrical insulation, protection from water intrusion, and/or reduction of friction for rotation of the joint.

Figure 4B:
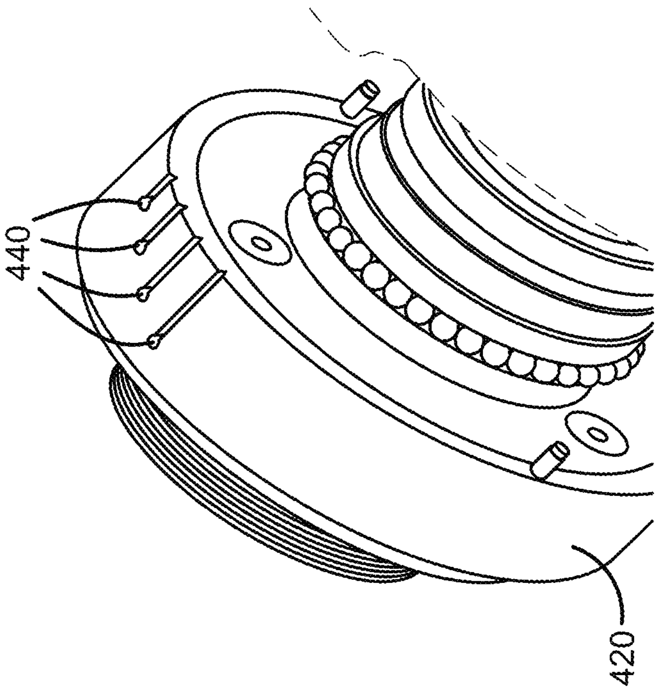
FIGS. 4A, 4B, 4C and 4D are component diagrams illustrating an example implementation of an alternate slip ring, where one or more portions of one or more techniques described herein may be implemented.
Figure 4A:
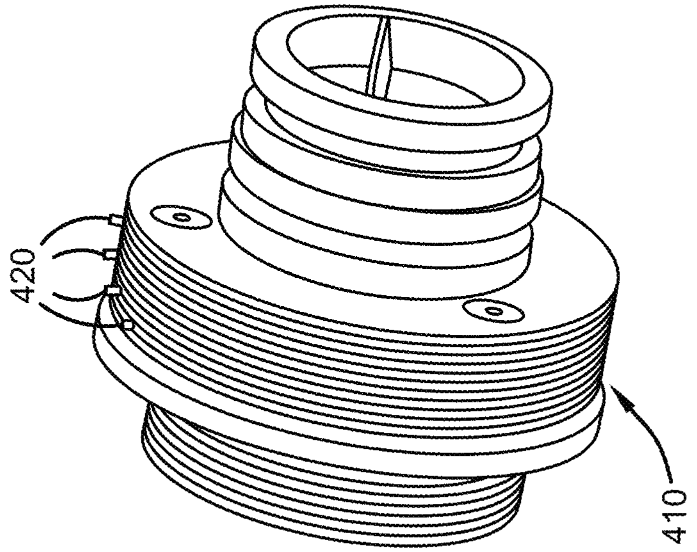
Figure 4D:
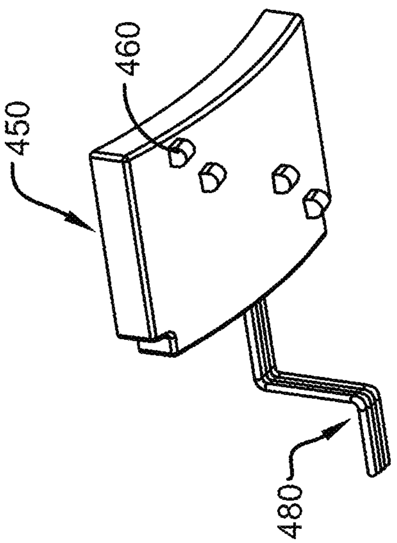
Figure 4C:
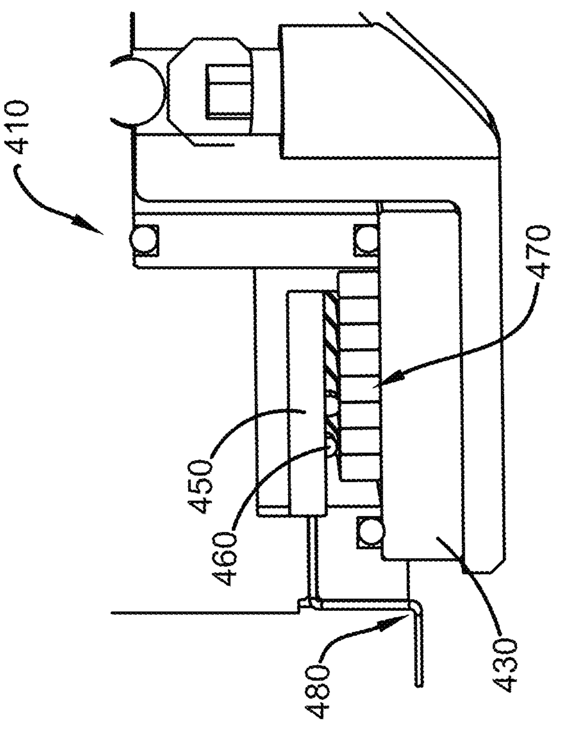

As shown in FIGS. 4C and 4D, in this implementation, a contact pad 450 can be disposed in the interior of slip ring 410. In this example, the contact pad 450 can be disposed on the rotating joint 140 portion of the coupling 250, and may provide electrical coupling using a wired connection 480 with an operably attached hose. Further, the contact pad 450 can comprise contact pins 460 that can operably be in electrical contact with a contact ring 470, and may remain in electrical contact (e.g., slidably) during rotation of the rotating joint 140. In one example, the contact pad 450 may comprise a plurality the contact pins 460 on a surface to be disposed in rotary electrical coupling with the contact ring 470. In this implementation, when the rotating joint 140 rotates, the contact pad 460 and the contact ring 470 may rotate around the same central axis (e.g., 260) and in the same or different rotational directions (e.g., independently of each other). In this way, the contact pins 460 may operably remain in electrical contact with the contact ring 470. Therefore, wired connection can be maintained during the rotation of the rotating joint 140.

Figure 5B:
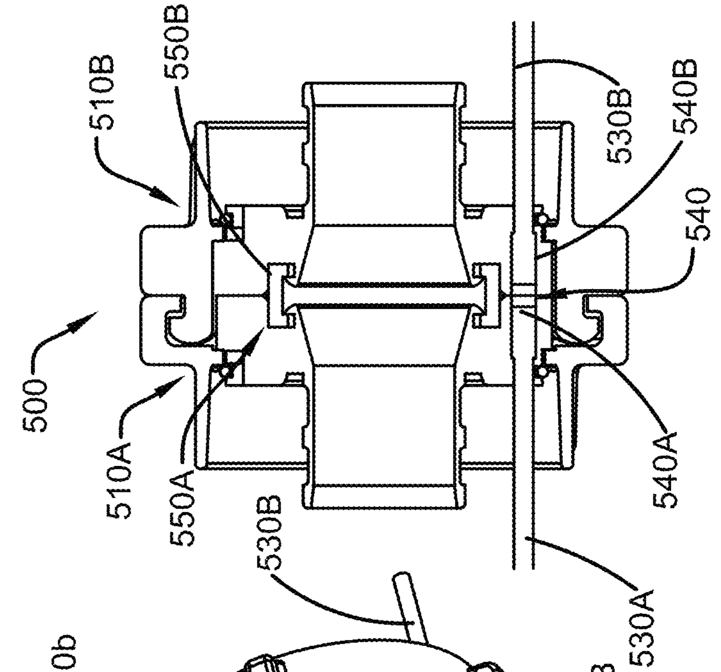
FIGS. 5A and 5B are component diagrams illustrating example implementations of hose couplings where one or more portions of one or more techniques and/or one or more systems described herein may be implemented.
Figure 5A:
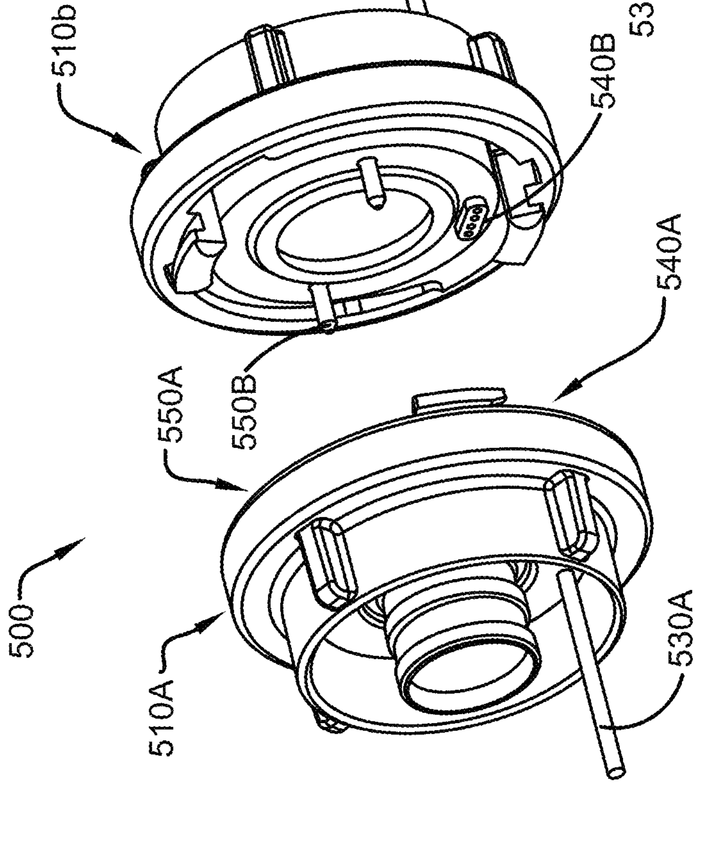

FIGS. 5A and 5B are component diagrams illustrating one example implementation of a hose-hose coupling 500 where an electrical/communication coupling can be operably maintained. In this example implementation, as shown in FIGS. 5A and 5B, the hose-hose coupler 500 can comprise a first hose coupler portion 510A and a second hose coupler portion 510B, respectively coupled to different hoses (e.g., first hose and second hose). Further, respective coupler portions 510A, 510B can comprise a wired hose electrical coupling port 540A, 540B (e.g., a first hose wired connector and a second hose wired connector), which, when joined, form an electrical/communications coupling 540. Additionally, respective coupler portions 510A, 510B can be coupled with wiring 530A, 530B to provide a connection for electrical/communication coupling between hoses.

In some implementations, the hose-hose coupler 500 can comprise one or more locating pins 550B or alignment tools that operably couple with a complementary pin receptacle (e.g., a hole, or pocket), or the like, to facilitate alignment between respective connectors 510A, 510B. When the respective coupler portions 510A, 510B of the hose-hose coupler 500 are coupled, the ports 540A, 540B can be coupled to provide electrical/communication coupling between hoses.

Figure 6B:
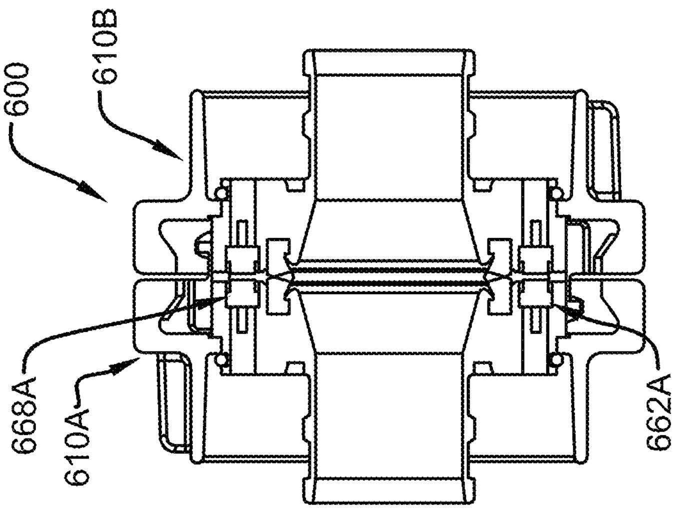
FIGS. 6A and 6B are component diagrams illustrating alternate example implementations of hose couplings where one or more portions of one or more techniques and/or one or more systems described herein may be implemented.
Figure 6A:
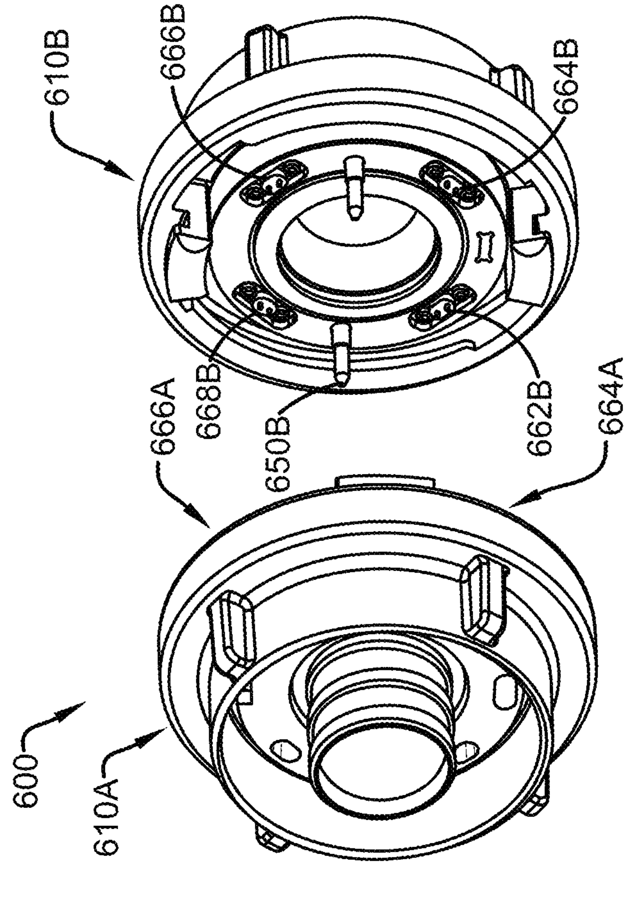

In another example implementation, as illustrated in FIGS. 6A and 6B, an alternate hose-hose coupler 600 can comprise a first hose coupling portion 610A, and a second hose coupling portion 610B. In this example implementation, the hose-hose coupler 600 can comprise a plurality of electrical coupling ports (hose wired connectors) 662A, 664A, 666A, 668A, 662B, 664B, 666B, 668B, on respective connectors 610A, 610B. In some implementations, four coupling ports 662, 664, 666, 668, for example, may be used to connect to electrical ground, one used to connect to an electrical power source, and two others used to communicate (e.g., transmit, receive) signals between a coupled nozzle (e.g., 100) and a Controller Area Network (CAN) (not shown). Further, as illustrated, the hose-hose coupler 600 can further comprise one or more locating pins 650B or alignment tools and complementary recesses, pockets, or the like, for alignment of the first and second connectors 610A, 610B to form the coupling 600 between hoses (e.g., a first hose and a second hose). When the hose-hose coupler 600 is coupled the hose wired connectors 662A, 664A, 666A, 668A on the first coupling portion 610A are electrically coupled with the hose wired connectors 662B, 664B, 666B, 668B on the second coupling portion 610B. In this way, for example, a wired connection is operably maintained between coupled hoses, and to a coupled nozzle.

Figure 7:
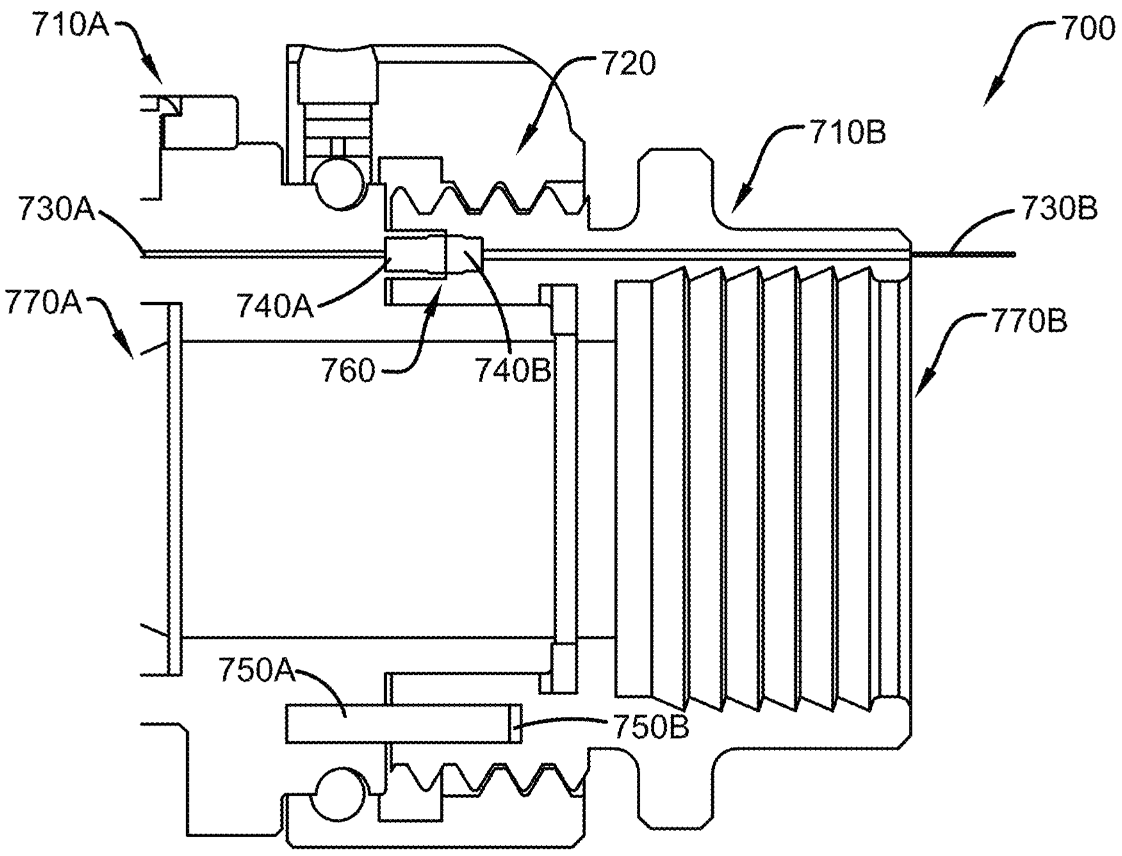
FIG. 7 is a component diagram illustrating an alternate implementation of an example, hose coupling where one or more portions of one or more techniques and/or one or more systems described herein may be implemented.

FIG. 7 is a component diagram illustrating an alternate implementation of an example hose-hose coupler 700, comprising an alternate coupling technique and apparatus. For example, the example hose-hose coupler 700 may be utilized in different systems (e.g., in U.S. based firefighting), using different standards for the equipment. In this example, a first coupling portion 710A of the hose-hose coupling 700 can be operably coupled with a second coupling portion of the hose-hose coupling 700 in a threaded coupling arrangement 720. Further, in this example, the first coupling portion 710A, which can be coupled with a hose 770A, comprises a first communication/electrical coupling port (hose wired connector) 740A; and the second hose coupling portion 710B comprises a second communication/electrical coupling port (wired connector) 740B. The first communication/electrical coupling port 740A can be operably coupled with the second communication/electrical coupling port 740B to form a communication/electrical coupling 760. As an example, the example hose coupling 700 can comprise one or more communication/electrical couplings 760, where one may comprise a communication coupling, and another may comprise an electrical power coupling. Additionally, a combination of communication and electrical power coupling may be accommodated in a single communication/electrical coupling 760

In this example, the hose coupling 700 can comprise one or more coupling/locating pins or alignment tools 750A and a complementary pin receptacle 750B. As an example, the locating pin 750A can be disposed on the first portion 710A and the pin receptacle 750B can be disposed on the second portion 710B. In this example, the locating pin 750A can be disposed in the pin receptacle 750B during the threaded coupling of the two hose coupling portions 710A, 710B together. In this way, for example, with the pin 750A and receptacle 750B aligned, the first communication/electrical coupling port 740A can be appropriately aligned with the second communication/electrical coupling port 740B to operably form the communication/electrical coupling 760 between hoses. The operably formation of the communication/electrical coupling 760 between hoses allows for electrical communication between a first wire 730A, on a first hose 770A and a second wire 730B on a second hose 770B. As an example, operable coupling of the nozzle to a hose, and subsequent hoses together can allow for communication and electrical power to be available to and from the nozzle to a central communication/power apparatus (e.g., fire truck).

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A fire-fighting nozzle communication system, comprising:

a nozzle tip to produce a output of fluid flow;

a shut-off valve assembly mechanically and fluidly coupled to the nozzle tip;

a communicator that operably generates and transmits a signal indicative of a user communication to a remote central controller through a wired connection; and a nozzle-hose coupler that operably couples the nozzle with a hose that is providing fluid to the nozzle, the nozzle-hose coupler comprising a rotating joint that mechanically connects the hose with the nozzle allowing the hose and the nozzle to rotate independently of each other around a central axis, wherein the rotating joint further electrically couples the hose with the communicator;

wherein the rotating joint is operably communicatively coupled with a wired communication bus in the hose.

2. The system of claim 1, comprising a hose to hose coupling that operably couples a first hose to a second hose, the hose to hose coupling comprising a first connector and a second connector that operably fluidly couple to form the hose to hose coupling, wherein the first connector and second connector respectively comprise at least one complementary communication coupler that operably couples to form a communication coupling between the first hose and second hose.

3. The system of claim 1, the rotating joint comprising a slip ring electrical coupler comprising a first slip ring and a second slip ring that rotate around the central axis independently of each other while maintaining electrical communication between each other.

4. The system of claim 3, the second slip ring electrically coupled with a wire coupler that operably couples with a wired connection on the hose.

5. The system of claim 3, the first slip ring electrically coupled with the communicator.

6. The system of claim 3, the first slip ring comprising one or more feet that operably engage with a complementary contact ring on the second slip ring in a slidable arrangement.

7. The system of claim 1, the rotating joint comprising a rotating electrical coupling comprising one or more contact pins on a first side and a contact ring on a second side, the contact pins complementary to the contact ring to provide rotational electrical coupling between the contact pins and the contact ring.

8. The system of claim 7, the one or more contact pins electrically coupled with a wired connection that is operably coupled to the hose.

9. The system of claim 7, the contact ring electrically coupled with the communicator.

10. The system of claim 1, the hose comprising a first hose wired connector that operably, electrically couples with a nozzle wired connector to provide communication between the communicator and the wired communication bus in the hose.

11. The system of claim 10, the hose comprising a hose-hose coupler, comprising a first portion disposed on a first hose and a second portion disposed on a second hose, the first portion and second portion operably, mechanically engaged to provide a fluid coupling between the first hose and second hose.

12. The system of claim 11, the first portion comprising a second hose wired connector and the second portion comprising a third hose wired connector, the second hose wired connector operably, communicatively coupling with the second hose wired connector to communicatively couple the first hose with the second hose.

13. The system of claim 12, the first portion comprising a first alignment tool and the second portion comprising a second alignment tool, the first and second alignment tools complementary to each other to operably align the first hose wired connector with the second hose wired connector.

14. The system of claim 1, the nozzle hose coupler comprising a rotating joint housing that operably houses a rotational electrical coupling between the hose and the nozzle, the rotating joint housing comprising one or more gaskets that operably provide a seal between the inside and outside of the housing to mitigate fluid intrusion into the housing.

15. A fire-fighting nozzle, comprising:

a nozzle tip that operably shapes and outputs a flow of fluid;

a valve assembly mechanically and fluidly engaged with the nozzle tip upstream to operably control the flow of fluid into the nozzle tip;

a communication device engaged with the valve assembly upstream, the communication device operably transmitting a signal indicative of a communication to a remote central controller through a wired connection from the nozzle through an operably connected hose; and a nozzle-hose coupler engaged with the communication device that operably fluidly and electrically couples with the connected hose, the nozzle-hose coupler electrically coupled with the communication device downstream and electrically coupled with the operably coupled hose upstream, the nozzle-hose coupler comprising a rotating joint that provides for independent rotation of the nozzle and the hose with respect to each other while maintaining electrical coupling between them.

16. The nozzle of claim 15, wherein the nozzle-hose coupler comprising a wired hose connector electrically coupled with the rotating joint and which is operably communicatively coupled with a wired communication bus in the hose.

17. The system of claim 15, the rotating joint comprising a slip ring electrical coupler comprising a first slip ring and a second slip ring that rotate around the central axis independently of each other while maintaining electrical communication between each other.

18. The system of claim 15, the rotating joint comprising a rotating electrical coupling comprising one or more contact pins on a first side and a contact ring on a second side, the contact pins complementary to the contact ring to provide rotational electrical coupling between the contact pins and the contact ring.

19. The system of claim 15, the communicator operably transmitting and/or receiving one or more of: sensor data indicative of a state of the nozzle, user input indicative of a command, user input indicative of communications, electrical power, and incoming commands indicative of an operation of the nozzle.

20. A fire-fighting nozzle communication system, comprising:

a nozzle tip that operably shapes and outputs a flow of fluid;

a valve assembly mechanically and fluidly engaged with the nozzle tip upstream to operably control the flow of fluid into the nozzle tip;

a communication device engaged with the valve assembly upstream, the communication device operably transmitting a signal indicative of a communication to a remote central controller through a wired connection from the nozzle through an operably connected hose;

a nozzle-hose coupler that operably couples the nozzle with a hose that is providing fluid to the nozzle, the nozzle-hose coupler comprising a rotating joint that mechanically connects the hose with the nozzle allowing the hose and the nozzle to rotate independently of each other around a central axis, wherein the rotating joint further electrically couples the hose with the communicator, wherein the rotating joint is operably communicatively coupled with a wired communication bus in the hose; and a hose to hose coupling that operably couples a first hose to a second hose, the hose to hose coupling comprising a first connector and a second connector that operably fluidly couple to form the hose to hose coupling, wherein the first connector and second connector respectively comprise at least one complementary communication coupler that operably couples to form a communication coupling between the first hose and second hose.

* * * * *